(12) United States Patent
Hardt et al.

(10) Patent No.: US 10,033,655 B2
(45) Date of Patent: Jul. 24, 2018

(54) PACKET PRIORITIZATION BASED ON CLIENT DEVICE FEEDBACK

(71) Applicant: ARRIS Enterprises, Inc., Suwanee, GA (US)

(72) Inventors: Charles Hardt, Lawrenceville, GA (US); Kurt Alan Lumbatis, Dacula, GA (US); Bradley Thomas Howard, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 378 days.

(21) Appl. No.: 14/845,454

(22) Filed: Sep. 4, 2015

(65) Prior Publication Data
US 2017/0070440 A1   Mar. 9, 2017

(51) Int. Cl.
| | | |
|---|---|---|
| *H04L 12/803* | (2013.01) | |
| *H04L 12/835* | (2013.01) | |
| *H04W 28/02* | (2009.01) | |
| *H04L 12/833* | (2013.01) | |
| *H04L 12/825* | (2013.01) | |
| *H04L 12/801* | (2013.01) | |

(52) U.S. Cl.
CPC ........... *H04L 47/30* (2013.01); *H04L 47/122* (2013.01); *H04L 47/2458* (2013.01); *H04L 47/263* (2013.01); *H04W 28/0231* (2013.01); *H04W 28/0284* (2013.01); *H04L 47/11* (2013.01); *H04W 28/0278* (2013.01)

(58) Field of Classification Search
CPC . H04L 47/122; H04L 47/2458; H04L 47/263; H04L 47/30; H04L 47/11; H04W 28/0231; H04W 28/0284; H04W 28/0278
USPC .................................................. 370/234, 236
See application file for complete search history.

(56) References Cited

U.S. PATENT DOCUMENTS

| | | |
|---|---|---|
| 2005/0111604 A1 | 5/2005 | Okuyama |
| 2006/0282566 A1 | 12/2006 | Virdi et al. |

FOREIGN PATENT DOCUMENTS

| | | | |
|---|---|---|---|
| WO | 02/056627 A1 | 7/2002 | |

OTHER PUBLICATIONS

PCT Search Report & Written Opinion, Re: Application No. PCT/US2016/045825, dated Nov. 16, 2016.
M. Esteve, et al., "Flow control mechanism with hysteresial techniques", Electronics Letters, IEEE Stevenage, GB, vol. 34, No. 4, Feb. 19, 1998., pp. 332-333.

(Continued)

*Primary Examiner* — Mark Rinehart
*Assistant Examiner* — Natali N Pascual Peguero
(74) *Attorney, Agent, or Firm* — Bart A. Perkins

(57) ABSTRACT

Methods, systems, and computer readable media can be operable to facilitate dynamic packet prioritization for delivery of content to multiple devices. Methods, systems, and computer readable media described herein are operable to prioritize packet delivery to a plurality of client devices based upon feedback received from the client devices, wherein the feedback includes buffer status information associated with the client devices. The rate of transmitting packets to a client device having a stressed buffer may be increased, while the rate of transmitting packets to one or more other client devices may be decreased. Buffer status information may be received periodically or conditionally at a central device in the form of feedback messages output from one or more client devices.

20 Claims, 7 Drawing Sheets

(56) References Cited

OTHER PUBLICATIONS

D. Shuman, et al., "Energy-efficient transmission scheduling for wireless media streaming with strict underflow constraints", Modeling and Optimization in Mobile Ad Hoc, and Wireless Networks and Workshops, 2008. WIOPT 2008, 6th International Symposium on, IEEE, Apr. 1, 2008, pp. 354-359.

PACKET PRIORITIZATION BASED ON CLIENT DEVICE FEEDBACK

TECHNICAL FIELD

This disclosure relates to the prioritization of packet delivery to client devices.

BACKGROUND

Local networks servicing a premise may provide for delivery of multimedia content over various mediums, such as one or more wireless channels. Multimedia content delivered over a wireless network can be particularly vulnerable to problems arising in the transmission of the content to a client device and in the processing of the content at the client device. For example, where multiple premises or devices are sharing the same wireless channel, multimedia content may be streamed to a plurality of client devices at one time, and it is possible that network congestion can cause macro blocking or total audio/video delivery failure where packets are consumed by a device at a faster rate than the rate at which packets are received by the device.

Typically, one or more buffers are used at a client device to account for the non-deterministic rate at which packets are delivered to a client device from an access point or central device providing a wireless network. The one or more buffers can temporarily store packets as they are received from an access point, and the client device can read packets from the one or more buffers for decoding and output. The rate at which a buffer is filled may depend on a number of factors including the bandwidth available to a client device.

Bandwidth allocated to a client device may depend on various factors, such as congestion of an associated wireless network, and an underflow condition may arise if the one or more buffers at a client device receive packets at a lower bit rate than the bit rate at which packets are read from the one or more buffers. For example, if a decoder is reading packets from a buffer at a faster rate than the rate at which packets are written into the buffer, the situation may arise where the buffer is emptied and the decoder has no packet to read from the buffer. An underflow condition can result in a stalled or fragmented picture in the output of the associated multimedia content. The rate at which packets are consumed by a client device may vary according to a number of factors including the type or quality of content received at the device (e.g., high-definition channels require more bandwidth than standard-definition channels).

Typically, a central device transmits packets evenly or at a common bitrate or quality of service to each of a plurality of client devices, and packet streams output to each of the plurality of client devices may be given the same priority level. However, client devices do not generally consume received packets at a constant or common bitrate, and one or more client devices within a group of client devices that are served by a common central device can become underserved or encounter an underflow event while other client devices within the group maintain a full or nearly full buffer. For example, a client device receiving a weak wireless signal from an access point may consume more airtime than client devices receiving a stronger wireless signal from the access point. Therefore, a need exists for improving methods and systems for prioritizing packet delivery to a plurality of client devices.

BRIEF DESCRIPTION OF THE DRAWINGS

Like reference numbers and designations in the various drawings indicate like elements.

DETAILED DESCRIPTION

Figure 1:
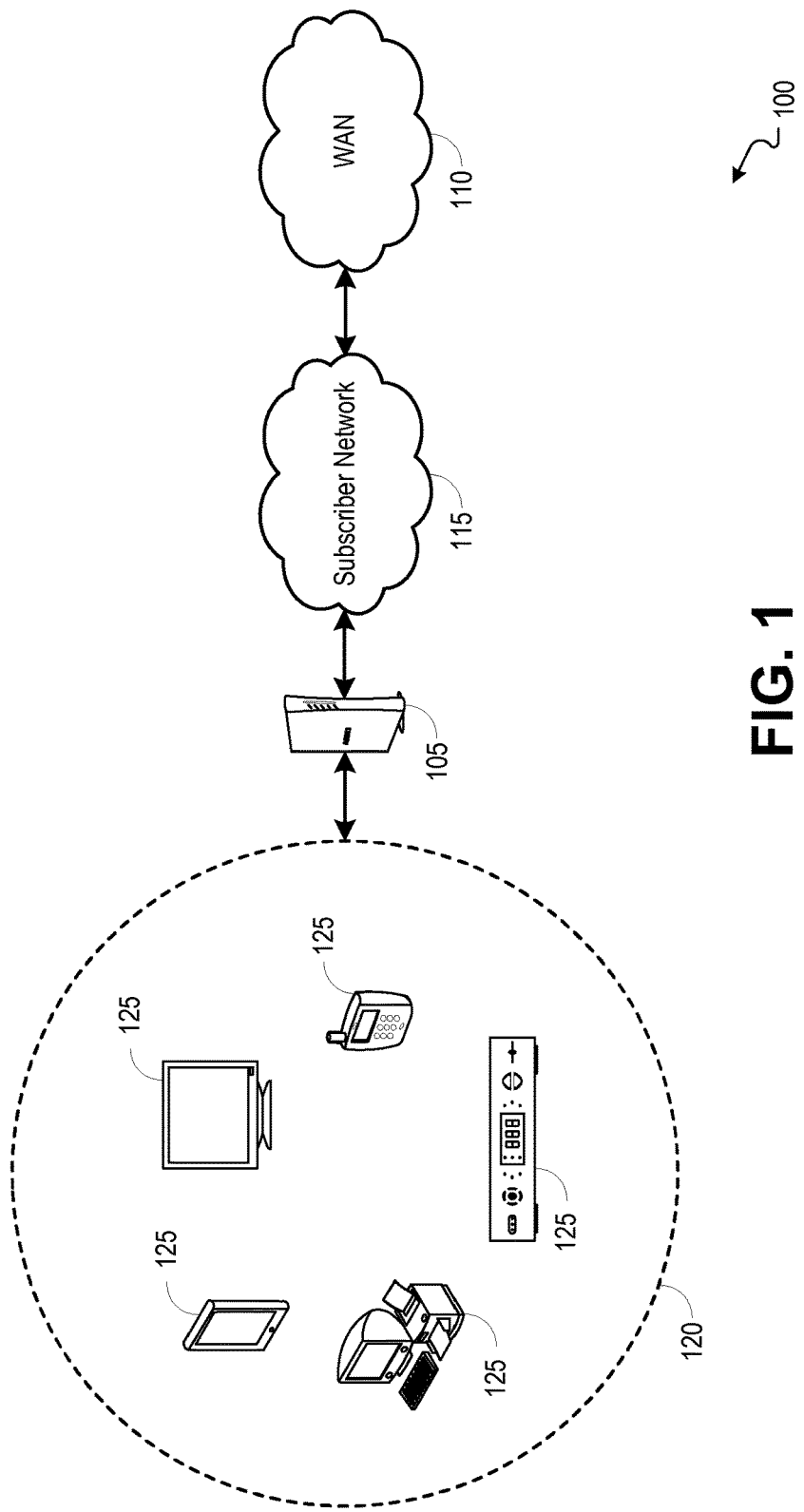
FIG. 1 is a block diagram illustrating an example network environment operable to facilitate dynamic packet prioritization for delivery of content to multiple devices.

It is desirable to improve upon methods and systems for prioritizing packet delivery to a plurality of client devices. Methods, systems, and computer readable media described herein are operable to prioritize packet delivery to a plurality of client devices based upon feedback received from the client devices, wherein the feedback includes buffer status information associated with the client devices. The rate of transmitting packets to a client device having a stressed buffer may be increased, while the rate of transmitting packets to one or more other client devices may be decreased. A client device operating at a stressed condition or having a stressed buffer may include devices having a buffer that is operating at a stressed level or at a level indicating that an underflow event at the buffer is imminent. Buffer status information may be received periodically or conditionally at a central device in the form of feedback messages output from one or more client devices.

In embodiments, a feedback mechanism may relay an audio/video decode buffer status from each client back to a central device (e.g., gateway, modem, router, or any other device operable to route communications to a plurality of devices). The audio/video decode buffer status may be communicated to a central device in a variety of formats, and may provide an indication of the capacity and/or usage of the associated audio/video decode buffer. For example, each client device may periodically, conditionally, or in response to a request output a current buffer fill position (e.g., using a position of a write pointer) to a central device. The position of a write pointer may vary at different client devices based on various factors. For example, the position of a write pointer within a buffer may depend on the data rate of source content, negotiated data rate between the client device and central device, and packet prioritizations (e.g., priority of client, device, flow, etc.).

An embodiment of the invention described herein may include a method comprising: (a) outputting one or more packet streams from a central device to each of a plurality of client devices; (b) receiving a message from one or more respective client devices of the plurality of client devices, wherein the message indicates the status of a buffer associated with each respective client device; (c) determining that at least one of the respective client devices is in a stressed condition based upon the buffer status indicated in the message received from the at least one respective client device, wherein the message indicates that the number of packets within the buffer associated with the at least one respective client device in a stressed condition is less than a threshold level; and (d) prioritizing the delivery of packets to the at least one respective client device that is determined to be in a stressed condition over the delivery of packets to the one or more other client devices within the plurality of client devices.

According to an embodiment of the invention, prioritizing the delivery of packets to the at least one respective client device that is determined to be in a stressed condition over the delivery of packets to the one or more other client devices within the plurality of client devices comprises: (a) decreasing the rate at which packets are delivered to the one or more other client devices within the plurality of client devices; and (b) increasing the rate at which packets are delivered to the at least one respective client device that is determined to be in a stressed condition.

According to an embodiment of the invention, the message received from at least one of the other client devices indicates that packets are being received by the buffer associated with the at least one of the other client devices at a rate greater than or equivalent to the rate at which packets are being output from the buffer, such that delivery of packets to the buffer may be delayed without causing the buffer to empty.

According to an embodiment of the invention, the message indicates the status of a buffer associated with a client device by identifying the position of a write pointer within the buffer.

According to an embodiment of the invention, the position of the write pointer within the buffer is identified with respect to one or more boundaries associated with the buffer.

According to an embodiment of the invention, requests are periodically output to one or more of the plurality of client devices for information associated with the status of a buffer, and the message from one or more respective client devices of the plurality of client devices is received in response to the requests.

According to an embodiment of the invention, requests are periodically output at a first frequency to devices that are not in a stressed condition, and requests are periodically output at a second frequency to devices that are in a stressed condition, the second frequency being higher than the first frequency.

According to an embodiment of the invention, when the at least one respective client device is no longer operating at a stressed condition, a default prioritization of packet delivery is re-established for the plurality of client devices.

An embodiment of the invention described herein may include an apparatus comprising: (a) one or more interfaces configured to be used to: (i) output one or more packet streams to each of a plurality of client devices; and (ii) receive a message from one or more respective client devices of the plurality of client devices, wherein the message indicates the status of a buffer associated with each respective client device; and (b) a module configured to: (i) determine that at least one of the respective client devices is in a stressed condition based upon the buffer status indicated in the message received from the at least one respective client device; and (ii) prioritize the delivery of packets to the at least one respective client device that is determined to be in a stressed condition over the delivery of packets to the one or more other client devices within the plurality of client devices.

An embodiment of the invention described herein may include one or more non-transitory computer readable media having instructions operable to cause one or more processors to perform the operations comprising: (a) outputting one or more packet streams from a central device to each of a plurality of client devices; (b) receiving a message from one or more respective client devices of the plurality of client devices, wherein the message indicates the status of a buffer associated with each respective client device; (c) determining that at least one of the respective client devices is in a stressed condition based upon the buffer status indicated in the message received from the at least one respective client device; and (d) prioritizing the delivery of packets to the at least one respective client device that is determined to be in a stressed condition over the delivery of packets to the one or more other client devices within the plurality of client devices.

FIG. 1 is a block diagram illustrating an example network environment 100 operable to facilitate dynamic packet prioritization for delivery of content to multiple devices. In embodiments, a central device 105 may provide video, audio and/or data services to a subscriber by communicating with a wide area network (WAN) 110 through a connection to a subscriber network 115 (e.g., hybrid fiber-coaxial network, fiber network, cellular network, high speed data network, etc.). The central device 105 may include a gateway device, a broadband modem, a wireless router including an embedded modem, or any other device or access point operable to route communications between one or more client devices and a network. The central device 105 may provide a local network 120 for delivering services to one or more client devices 125. The local network 120 may include a local area network (LAN), wireless local area network (WLAN), personal area network (PAN), Multimedia over Coax Alliance (MoCA) network, mobile hotspot network, and others.

A subscriber can request, receive and interact with multimedia and/or data services through a client device 125. A client device 125 may include a set-top box (STB), computer, mobile device, tablet, television, and any other device operable to receive multimedia and/or data services. Multimedia and/or data services may be received at a client device 125 through a connection to a central device 105. It should be understood that a television may receive multimedia and/or data services through a connection to a central device 105 and/or a STB. While the components shown in FIG. 1 are shown separate from each other, it should be understood that the various components can be integrated into each other.

The central device 105 may provide a WLAN for client devices 125 within range of the central device 105 (or within range of a wireless extender configured to route communications between the central device 105 and client devices 125), and multimedia and/or data services may be provided to client devices 125 through wireless communications (e.g., Wi-Fi). The bit rate at which communications are passed over a WLAN may vary according to many different factors, the number of client devices 125 connected to the WLAN and the strength of a wireless radio signal received at each client device 125 from the central device 105 being only a couple of such factors. As a result of a varying bitrate, client devices 125 may buffer multimedia content as it is received. For example, a client device 125 may store packets of a received multimedia stream in a buffer for a period of time before outputting the packets to a decoder such that the decoder receives the packets at a more consistent bit rate.

When a WLAN provided by a central device 105 becomes congested to a certain point, client devices 125 generally receive multimedia content at a lower bit rate. When the bit rate at which a client device 125 receives content falls to a certain level, the rate at which packets are loaded into the client device's buffer may fall below the rate at which packets are output from the buffer for playback of the associated multimedia content. A shortfall in the bit rate of incoming packets into the buffer can lead to an underflow event, wherein a read pointer catches up to a write pointer at the buffer, and the read pointer is therefore pointing to an empty slot in the buffer. When an underflow event occurs at a buffer, the device's decoder becomes starved of packets needed to output the associated multimedia content at an expected quality level. For example, an underflow event can lead to macro-blocking, a stalled or fragmented picture, or loss of media.

In embodiments, a client device 125 can monitor and report real-time statistics or status updates for an associated buffer (e.g., audio/video buffer). The client device 125 can monitor the relative positions of the write and read pointers of an associated buffer. For example, the read pointer may read and output packets from the bottom of the buffer, and the write pointer may write packets into the buffer at the next highest slot that is available (e.g., slot that is not filled with a packet) within the buffer. As the buffer empties, the distance between the write pointer and read pointer decreases and as the buffer fills, the distance between the write pointer and read pointer increases. It should be understood that the buffer may be a circular buffer.

Each buffer may include various regions indicating the status of the buffer or the rate at which packets are being received by the buffer with respect to the rate at which packets are being output from the buffer. For example, each buffer may have a maximum capacity, the maximum capacity being the maximum number of packets that may be retained by the buffer at any given time. Each buffer may have a normal operating region, the normal operating region being the portion of the buffer that is below the maximum capacity of the buffer and above a normal operating threshold. Each buffer may have a stressed operating region, the stressed operating region being the portion of the buffer that is below the normal operating threshold and above an underflow threshold. Each buffer may have an underflow region, the underflow region being the portion of the buffer that is below the underflow threshold. It should be understood that the normal operating threshold and the underflow threshold may be measured according to a certain distance between the read pointer and write pointer, wherein the certain distance indicates the number of slots within the buffer that are filled relative to the maximum capacity of the buffer.

In embodiments, the central device 105 can request and/or periodically receive reports from client devices 125, the reports including information identifying the position of a write pointer within a buffer associated with each respective client device 125. Each report may include information identifying the position of a write pointer at a certain time or over a certain period of time. The identification of the write pointer position may be based upon the position of the write pointer relative to one or more threshold buffer positions (e.g., above or below a normal operating threshold, underflow threshold, etc.). A client device 125 may output a report to a central device 105 when a write pointer crosses a boundary within an associated buffer or when the write pointer enters or has been within a certain region of the buffer for a predetermined period of time. For example, a client device 125 can signal a central device 105 when a write pointer crosses a normal operating threshold or underflow threshold of an associated buffer.

The central device 105 may make a determination as to the buffer status or delivery health or status of a multimedia stream delivered over a wireless connection to a client device 125 based upon feedback received from the client device 125. For example, when a write pointer is positioned within a normal operating region of a buffer associated with a client device 125, the central device 105 can determine that the client device 125 is receiving packets at a rate sufficient to keep up with the rate at which packets are being output by the respective buffer. When a write pointer is positioned in a stressed operating region or underflow region of a buffer associated with a client device 125, the central device 105 can determine that packets are being output from the respective buffer at a faster rate than the rate at which packets are being received by the client device 125.

In embodiments, the central device 105 can respond to write pointer reports received from one or more client devices 125 by adjusting the rate and/or order at which packets are transmitted to the client devices 125. For example, when each respective buffer of a plurality of client devices 125 is operating at a normal operating condition, the central device 105 can schedule the output of packets to the client devices 125 evenly or at a common bit rate. When a write pointer within a buffer of one or more client devices 125 within a group of client devices 125 enters a stressed operating region of the respective buffer, the central device 105 can increase the rate at which packets are output to the one or more client devices 125 that are operating at a stressed level (i.e., client devices 125 operating at a stressed level may include client devices 125 having a buffer operating at a level indicating that an underflow event has occurred or is imminent) and can decrease the rate at which packets are output to other client devices 125 that are operating at a normal condition. When a write pointer within a buffer of one or more client devices 125 within a group of client devices 125 enters an underflow region of the respective buffer, the central device 105 can further increase the rate at which packets are output to the one or more client devices 125 that are operating at an underflow level and can further decrease the rate at which packets are output to other client devices 125 that are operating at a normal condition or stressed condition.

In embodiments, where multiple client devices 125 are in a stressed or underflow condition, and the central device 105 does not have enough bandwidth to refill or restore each of the multiple client devices 125, the central device 105 may identify one or more of the multiple client devices 125 for which to increase the rate of packet transmissions. The central device 105 may further determine that service flow(s) to one or more client devices may be temporarily terminated or delayed to account for the increased rate of packet transmissions targeted at another client device 125. The determination may be based on priority levels associated with each of the client devices 125, and the priority levels may be based upon a variety of parameters or characteristics (e.g., type of data flow delivered to the client device, subscription level associated with the client device, primary user of the client device, etc.). For example, a certain user or device within a subscriber premise (e.g., Dad's television) may be given priority over other users or devices, and certain content that a user has purchased (e.g., pay-per view content, video on-demand (VoD) content, etc.) may be given priority over other types of content.

Figure 2A:
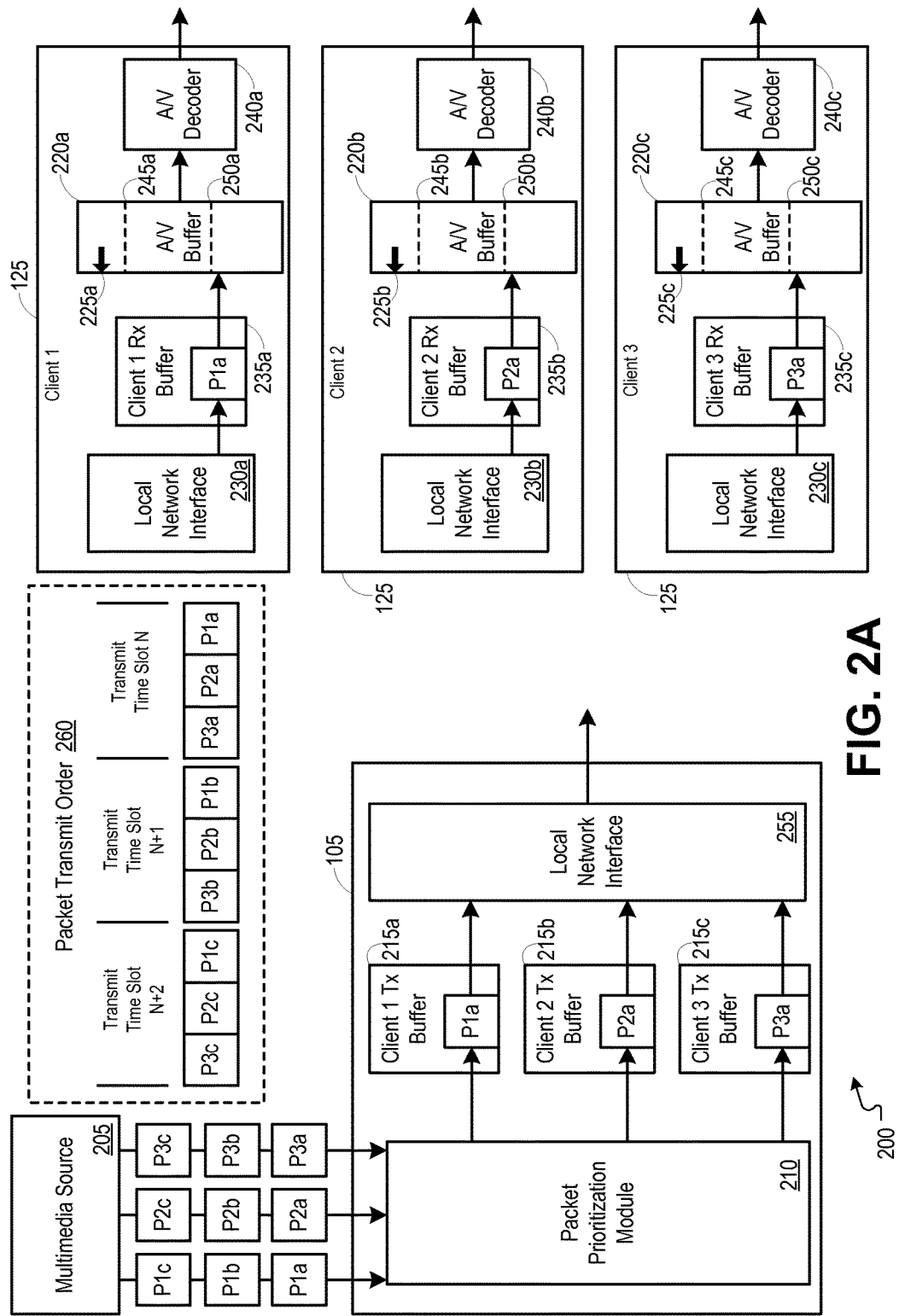
FIG. 2A is a block diagram illustrating an example network environment operable to facilitate dynamic packet prioritization for delivery of content to multiple devices, wherein each of the multiple devices is operating at a normal operating condition.

FIG. 2A is a block diagram illustrating an example network environment 200 operable to facilitate dynamic packet prioritization for delivery of content to multiple devices, wherein each of the multiple devices is operating at a normal operating condition. According to FIG. 2A, client devices 125 (e.g., clients 1-3) are receiving packets from a central device 105 at a rate that is sufficient to sustain the rate at which packets are being consumed by each of the client devices 125.

In embodiments, the central device 105 may receive one or more multimedia streams from a multimedia source 205. The multimedia streams may be received at the central device 105 as one or more packet streams. As an example, a packet stream destined for client device 1 is received at the central device 105 as packets P1a-c, a packet stream destined for client device 2 is received at the central device 105 as packets P2a-c, and a packet stream destined for client device 3 is received at the central device 105 as packets P3a-c.

In embodiments, packet streams may be received at the central device 105 by a packet prioritization module 210. The packet prioritization module 210 may control the rate at which transmitter buffers for individual devices (e.g., client 1 transmitter buffer 215a, client 2 transmitter buffer 215b, client 3 transmitter buffer 215c) are filled with packets destined for a device associated with the transmitter buffer. The rate at which transmitter buffers are filled with packets may be based upon the congestion of a network used for delivering content to client devices and/or the status of audio/video buffers 220a-c at client devices serviced by the central device 105 (e.g., client devices 1-3). While the client transmitter buffers 215a-c are shown in FIG. 2A as being linear, it should be understood that the client transmitter buffers 215a-c may be circular buffers.

In embodiments, the status of audio/video buffers 220a-c at client devices may be determined based upon the position of a write pointer 225a-c within each respective audio/video buffer 220a-c. Packets may be received from a central device 105 at a client device 125 through a local network interface 230a-c. As packets are received at a client device 125, the received packets may be placed into a receiver buffer (e.g., client receiver buffer 235a-c). From the client receiver buffers 235a-c, packets may be moved or written into an audio/video buffer 220a-c. As an example, a buffer may be filled from the bottom to the top, wherein a packet is written into a buffer at the position of a write pointer 225a-c, and the write pointer 225a-c may be positioned at the highest available slot in the buffer. Packets may be read or removed from the bottom of the audio/video buffers 220a-c by an audio/video decoder 240a-c, and may be output from an audio/video decoder 240a-c to a display device associated with the respective client device 125. Those skilled in the relevant art will appreciate that this is only one example type of buffer, and that various types of buffers may be used as the audio/video buffers 220a-c. While the audio/video buffers 220a-c are shown in FIG. 2A as being linear, it should be understood that the audio/video buffers 220a-c may be circular buffers.

While an audio/video buffer 220a-c is being filled with packets at a faster rate than the rate at which packets are being removed from the audio/video buffer 220a-c, an associated write pointer 225a-c will continue to rise within the buffer until the buffer is eventually filled to a maximum capacity. While the audio/video buffer 220a-c is being filled with packets at a slower rate than the rate at which packets are being removed from the audio/video buffer 220a-c, an associated write pointer 225a-c will continue to drop within the buffer until the buffer is eventually emptied.

In embodiments, each audio/video buffer may include various regions indicating the rate at which packets are being received by the buffer with respect to the rate at which packets are being output from the buffer. For example, each audio/video buffer may have a maximum capacity, the maximum capacity being the maximum number of packets that may be retained by the buffer at any given time. Each buffer may have a normal operating region, the normal operating region being the portion of the buffer that is below the maximum capacity of the buffer and above a normal operating threshold (e.g., normal operating threshold 245a-c). Each buffer may have a stressed operating region, the stressed operating region being the portion of the buffer that is below the normal operating threshold and above an underflow threshold (e.g., underflow threshold 250a-c). Each buffer may have an underflow region, the underflow region being the portion of the buffer that is below the underflow threshold. It should be understood that the maximum capacity of a buffer may be upgraded or may be variable, and that the thresholds and regions may be altered accordingly.

The central device 105 may make a determination as to the status of the audio/video buffers 220a-c based upon feedback received from the various client devices (e.g., clients 1-3) associated with the audio/video buffers. For example, when the write pointer 225a-c is positioned within the normal operating region of an audio/video buffer 220a-c (as is the case for the write pointers 225a-c shown in FIG. 2A), the packet prioritization module 210 can determine that the client device associated with the respective audio/video buffer 220 is receiving packets at a rate sufficient to keep up with the rate at which packets are being output by the respective audio/video buffer 220. It should be understood that a client device 125 can provide feedback associated with the position of a write pointer to the central device 105 periodically or conditionally (e.g., when the write pointer crosses a threshold boundary, when the write pointer has been within a certain buffer region for a predetermined period of time, etc.).

In embodiments, the packet prioritization module 210 can prioritize packet transmissions by regulating the rate and/or order at which packets are transmitted to client devices. For example, when the packet prioritization module 210 determines that each audio/video buffer 220a-c of a plurality of clients (e.g., clients 1-3) are operating at a normal operating condition (as is the case in FIG. 2A), the packet prioritization module 210 can schedule the output of packets to the client devices evenly or at a common rate. As an example, where each of clients 1-3 are operating at a normal operating condition, the output of packets to clients 1-3 may be scheduled at a 1:1:1 (client 1:client 2:client 3) ratio.

In embodiments, the packet prioritization module 210 can regulate the rate at which packets are transmitted to client devices by manipulating the order at which packets are placed into client transmitter buffers 215a-c. For example, when each of clients 1-3 are operating at a normal operating condition, the packet prioritization module 210 may cause the client transmitter buffers 215a-c to be filled evenly (e.g., where bandwidth permits three packets to be output, one packet may be placed into each of the client transmitter buffers 215*a-c*). Packets may be output from the client transmitter buffers 215*a-c* to an associated client device through a local network interface 255 (e.g., Wi-Fi, Ethernet, MoCA, etc.). The output of packets from the client transmitter buffers 215*a-c* may be scheduled such that all packets within a first buffer (e.g., client 1 transmitter buffer 215*a*) are output, then all packets within a second buffer (e.g., client 2 transmitter buffer 215*b*) are output, then all packets within a next buffer (e.g., client 3 transmitter buffer 215*c*) are output, and after all packets are output from the last client transmitter buffer, the transmission algorithm may be repeated starting at the first buffer. As an example, where each of clients 1-3 are operating at a normal operating condition, and the client transmitter buffers 215*a-c* are filled evenly, transmission of the packets from the client transmitter buffers 215*a-c* would result in the packet transmit order 260. During transmit time slot "N," packets P1*a*, P2*a* and P3*a* are delivered to their respective client devices 125, placed into an associated client receiver buffer 235*a-c*, and added to an audio/video buffer 220*a-c*.

Figure 2B:
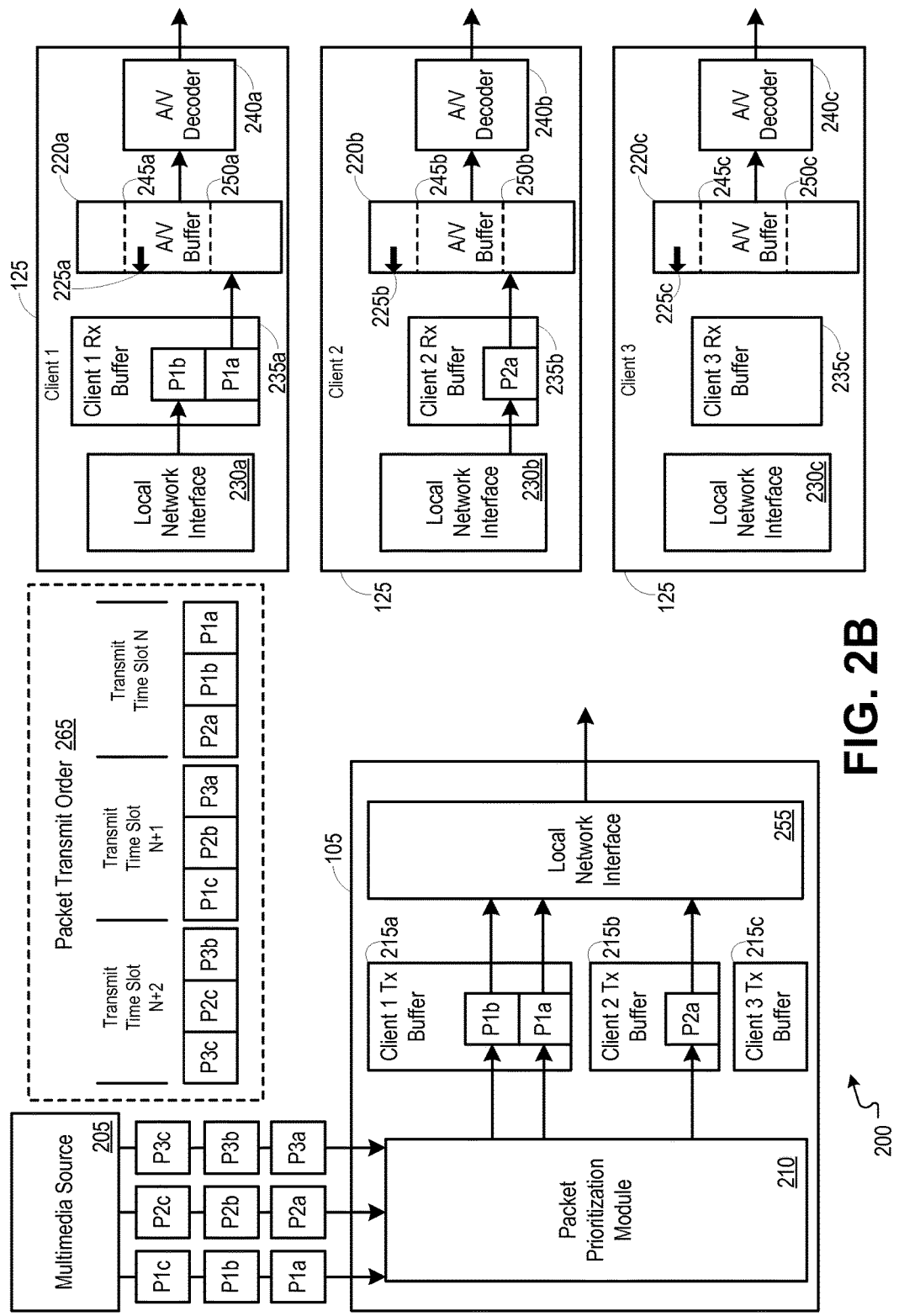
FIG. 2B is a block diagram illustrating an example network environment operable to facilitate dynamic packet prioritization for delivery of content to multiple devices, wherein one or more of the multiple devices are operating at a stressed operating condition.

FIG. 2B is a block diagram illustrating an example network environment 200 operable to facilitate dynamic packet prioritization for delivery of content to multiple devices, wherein one or more of the multiple devices are operating at a stressed operating condition. According to FIG. 2B, client 1 is consuming packets at a faster rate than packets are being received by the client, and clients 2 and 3 are receiving packets from a central device 105 at a rate that is sufficient to sustain the rate at which packets are being consumed by each of the clients 2 and 3.

In embodiments, the central device 105 may receive one or more multimedia streams from a multimedia source 205. The multimedia streams may be received at the central device 105 as one or more packet streams. As an example, a packet stream destined for client device 1 is received at the central device 105 as packets P1*a-c*, a packet stream destined for client device 2 is received at the central device 105 as packets P2*a-c*, and a packet stream destined for client device 3 is received at the central device 105 as packets P3*a-c*.

In embodiments, packet streams may be received at the central device 105 by a packet prioritization module 210. The packet prioritization module 210 may control the rate at which transmitter buffers for individual devices (e.g., client 1 transmitter buffer 215*a*, client 2 transmitter buffer 215*b*, client 3 transmitter buffer 215*c*) are filled with packets destined for a device associated with the transmitter buffer. The rate at which transmitter buffers are filled with packets may be based upon the congestion of a network used for delivering content to client devices and/or the status of audio/video buffers 220*a-c* at client devices serviced by the central device 105 (e.g., client devices 1-3). While the client transmitter buffers 215*a-c* are shown in FIG. 2B as being linear, it should be understood that the client transmitter buffers 215*a-c* may be circular buffers.

In embodiments, the status of audio/video buffers 220*a-c* at client devices may be determined based upon the position of a write pointer 225*a-c* within each respective audio/video buffer 220*a-c*. Packets may be received from a central device 105 at a client device 125 through a local network interface 230*a-c*. As packets are received at a client device 125, the received packets may be placed into a receiver buffer (e.g., client receiver buffer 235*a-c*). From the client receiver buffers 235*a-c*, packets may be moved or written into an audio/video buffer 220*a-c*. As an example, a buffer may be filled from the bottom to the top, wherein a packet is written into a buffer at the position of a write pointer 225*a-c*, and the write pointer 225*a-c* may be positioned at the highest available slot in the buffer. Packets may be read or removed from the bottom of the audio/video buffers 220*a-c* by an audio/video decoder 240*a-c*, and may be output from an audio/video decoder 240*a-c* to a display device associated with the respective client device 125. Those skilled in the relevant art will appreciate that this is only one example type of buffer, and that various types of buffers may be used as the audio/video buffers 220*a-c*. While the audio/video buffers 220*a-c* are shown in FIG. 2B as being linear, it should be understood that the audio/video buffers 220*a-c* may be circular buffers.

While an audio/video buffer 220*a-c* is being filled with packets at a faster rate than the rate at which packets are being removed from the audio/video buffer 220*a-c*, an associated write pointer 225*a-c* will continue to rise within the buffer until the buffer is eventually filled to a maximum capacity. While the audio/video buffer 220*a-c* is being filled with packets at a slower rate than the rate at which packets are being removed from the audio/video buffer 220*a-c*, an associated write pointer 225*a-c* will continue to drop within the buffer until the buffer is eventually emptied.

In embodiments, each audio/video buffer may include various regions indicating the rate at which packets are being received by the buffer with respect to the rate at which packets are being output from the buffer. For example, each audio/video buffer may have a maximum capacity, the maximum capacity being the maximum number of packets that may be retained by the buffer at any given time. Each buffer may have a normal operating region, the normal operating region being the portion of the buffer that is below the maximum capacity of the buffer and above a normal operating threshold (e.g., normal operating threshold 245*a-c*). Each buffer may have a stressed operating region, the stressed operating region being the portion of the buffer that is below the normal operating threshold and above an underflow threshold (e.g., underflow threshold 250*a-c*). Each buffer may have an underflow region, the underflow region being the portion of the buffer that is below the underflow threshold.

The central device 105 may make a determination as to the status of the audio/video buffers 220*a-c* based upon feedback received from the various client devices (e.g., clients 1-3) associated with the audio/video buffers. For example, when the write pointer 225*a-c* is positioned within the normal operating region of an audio/video buffer 220*a-c* (as is the case for the write pointers 225*b-c* shown in FIG. 2B), the packet prioritization module 210 can determine that the client device associated with the respective audio/video buffer 220 is receiving packets at a rate sufficient to keep up with the rate at which packets are being output by the respective audio/video buffer 220. When the write pointer 225*a-c* is positioned within the stressed operating region of an audio/video buffer 220*a-c* (as is the case for the write pointer 225*a* shown in FIG. 2B), the packet prioritization module 210 can determine that the client device associated with the respective audio/video buffer 220 is consuming packets from the buffer at a faster rate than the rate at which packets are being written into the buffer. Thus, the packet prioritization module 210 can determine that delivery of packets to the stressed client device (e.g., client 1) should be prioritized over client devices that are operating at a normal condition (e.g., clients 2 and 3). It should be understood that a client device 125 can provide feedback associated with the position of a write pointer to the central device 105 periodically or conditionally (e.g., when the write pointer crosses a threshold boundary, when the write pointer has been within a certain buffer region for a predetermined period of time, etc.).

Where the central device 105 and/or corresponding local network (e.g., local network 120 of FIG. 1) are operating at or near a predetermined maximum bandwidth, increasing the rate at which data is delivered to a client device 125 (e.g., client 1) may come at the expense of another client device 125 (e.g., client 2 and/or 3). The packet prioritization module may compare the positions of write pointers 225a-c for each client device 125 to determine which if any of the client devices (e.g., clients 1-3) are in the best position to potentially handle a slowdown of data delivery. In FIG. 2B, the position of write pointer 225c indicates that the audio/video buffer 220c associated with client 3 is nearly full, thus the packet prioritization module 210 may make the determination to briefly hold off sending a packet to client 3, and use the additional air time or bandwidth to send additional data to client 1.

In embodiments, the packet prioritization module 210 can prioritize packet transmissions by regulating the rate and/or order at which packets are transmitted to client devices. For example, when the packet prioritization module 210 determines that audio/video buffer 220a of client 1 is operating at a stressed operating condition and that each audio/video buffer 220b-c of clients 2 and 3 are operating at a normal operating condition (as is the case in FIG. 2B), the packet prioritization module 210 can schedule the output of packets such that client 1 is favored over clients 2 and/or 3. As an example, a transmission of packets to client 3 can be skipped or delayed such that an extra packet transmission can be made to client 1. The output of packets to clients 1-3 may be scheduled at a 2:1:0 (client 1:client 2:client 3) ratio.

In embodiments, the packet prioritization module 210 can regulate the rate at which packets are transmitted to client devices by manipulating the order at which packets are placed into client transmitter buffers 215a-c. For example, when client 1 is operating at a stressed operating condition and each of clients 2 and 3 are operating at a normal operating condition, the packet prioritization module 210 may give greater priority to filling client 1 transmitter buffer 215a over client transmitter buffers 215b-c (e.g., where bandwidth permits three packets to be output, two packets may be placed into client 1 transmitter buffer 215a, one packet may be placed into client 2 transmitter buffer 215b, and client 3 transmitter buffer 215c can be left empty). Thus, during the current packet transmission instance shown in FIG. 2B, a packet is withheld from client 3 so that an additional packet may be delivered to client 1 to allow the audio/video buffer 220a to refill.

Packets may be output from the client transmitter buffers 215a-c to an associated client device through a local network interface 255 (e.g., Wi-Fi, Ethernet, MoCA, etc.). The output of packets from the client transmitter buffers 215a-c may be scheduled such that all packets within a first buffer (e.g., client 1 transmitter buffer 215a) are output, then all packets within a second buffer (e.g., client 2 transmitter buffer 215b) are output, then all packets within a next buffer (e.g., client 3 transmitter buffer 215c) are output, and after all packets are output from the last client transmitter buffer, the transmission algorithm may be repeated starting at the first buffer. As an example, where client 1 is operating at a stressed operating condition and each of clients 2 and 3 are operating at a normal operating condition, and the client transmitter buffers 215a-c are filled according to client 1 having a higher priority than clients 2 and 3, transmission of the packets from the client transmitter buffers 215a-c would result in the packet transmit order 265. During transmit time slot "N," two packets (P1a-b) are delivered to client 1 whereas only one packet (P2a) is delivered to client 2 and no packets are delivered to client 3. Packets output from the central device 105 during transmit time slot "N" are placed into an associated client receiver buffer 235a-b, and added to an audio/video buffer 220a-b. Prioritization of transmissions to client 1 over transmissions to clients 2 and/or 3 may be continued (e.g., through transmit time slot N+1, transmit time slot N+2, and so on) until the write pointer 225a crosses the normal operating threshold 245a to enter a normal operating region.

Figure 2C:
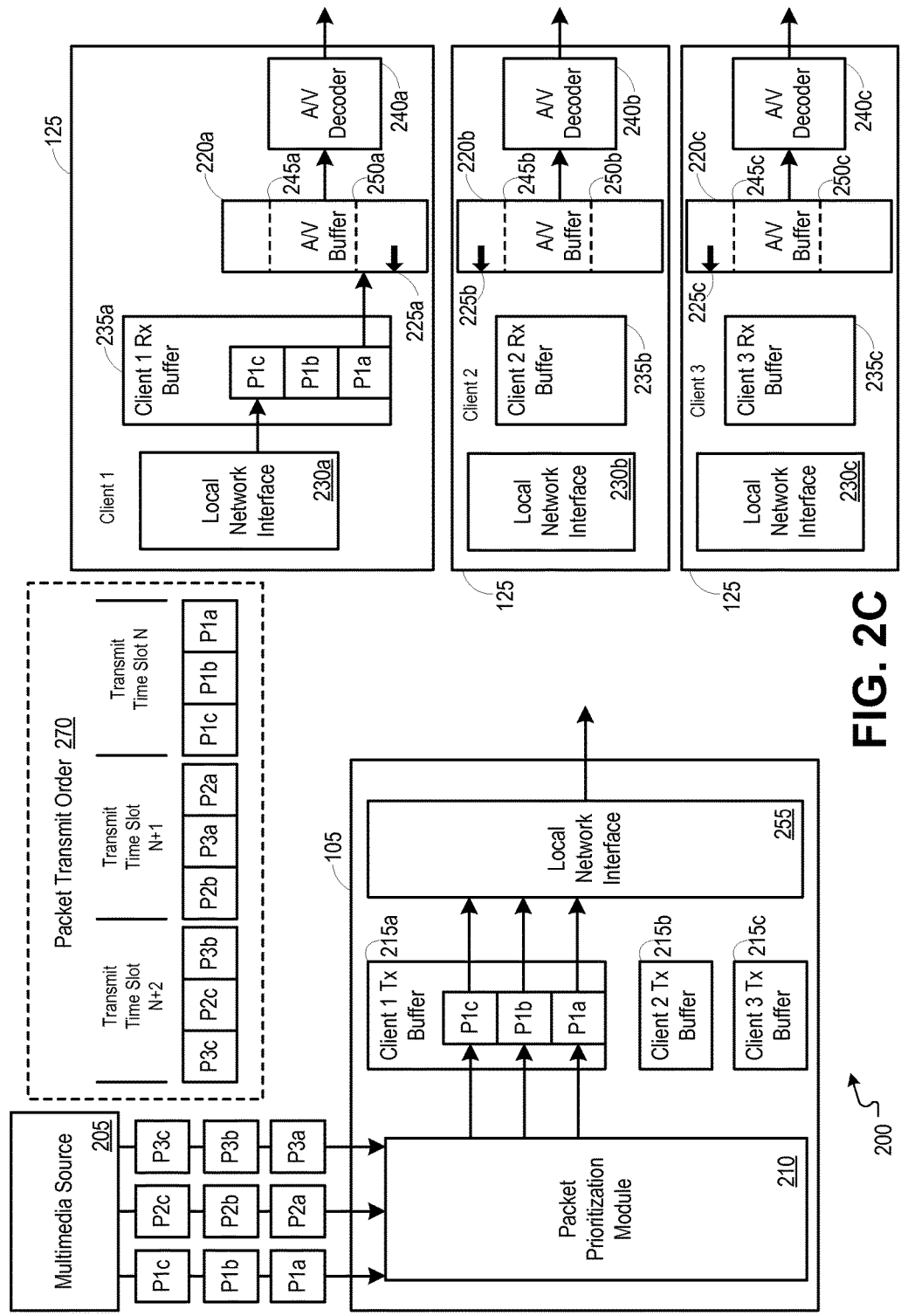
FIG. 2C is a block diagram illustrating an example network environment operable to facilitate dynamic packet prioritization for delivery of content to multiple devices, wherein an underflow event is imminent at one or more of the multiple devices.

FIG. 2C is a block diagram illustrating an example network environment 200 operable to facilitate dynamic packet prioritization for delivery of content to multiple devices, wherein an underflow event is imminent at one or more of the multiple devices. According to FIG. 2C, client 1 is consuming packets at a faster rate than packets are being received by the client, such that client 1 is at risk of an underflow event, whereas clients 2 and 3 are receiving packets from a central device 105 at a rate that is sufficient to sustain the rate at which packets are being consumed by each of the clients 2 and 3.

In embodiments, the central device 105 may receive one or more multimedia streams from a multimedia source 205. The multimedia streams may be received at the central device 105 as one or more packet streams. As an example, a packet stream destined for client device 1 is received at the central device 105 as packets P1a-c, a packet stream destined for client device 2 is received at the central device 105 as packets P2a-c, and a packet stream destined for client device 3 is received at the central device 105 as packets P3a-c.

In embodiments, packet streams may be received at the central device 105 by a packet prioritization module 210. The packet prioritization module 210 may control the rate at which transmitter buffers for individual devices (e.g., client 1 transmitter buffer 215a, client 2 transmitter buffer 215b, client 3 transmitter buffer 215c) are filled with packets destined for a device associated with the transmitter buffer. The rate at which transmitter buffers are filled with packets may be based upon the congestion of a network used for delivering content to client devices and/or the status of audio/video buffers 220a-c at client devices serviced by the central device 105 (e.g., client devices 1-3). While the client transmitter buffers 215a-c are shown in FIG. 2C as being linear, it should be understood that the client transmitter buffers 215a-c may be circular buffers.

In embodiments, the status of audio/video buffers 220a-c at client devices may be determined based upon the position of a write pointer 225a-c within each respective audio/video buffer 220a-c. Packets may be received from a central device 105 at a client device 125 through a local network interface 230a-c. As packets are received at a client device 125, the received packets may be placed into a receiver buffer (e.g., client receiver buffer 235a-c). From the client receiver buffers 235a-c, packets may be moved or written into an audio/video buffer 220a-c. As an example, a buffer may be filled from the bottom to the top, wherein a packet is written into a buffer at the position of a write pointer 225a-c, and the write pointer 225a-c may be positioned at the highest available slot in the buffer. Packets may be read or removed from the bottom of the audio/video buffers 220a-c by an audio/video decoder 240a-c, and may be output from an audio/video decoder 240a-c to a display device associated with the respective client device 125. Those skilled in the relevant art will appreciate that this is only one example type of buffer, and that various types of buffers may be used as the audio/video buffers 220a-c. While the audio/video buffers 220a-c are shown in FIG. 2C as being linear, it should be understood that the audio/video buffers 220a-c may be circular buffers.

While an audio/video buffer 220a-c is being filled with packets at a faster rate than the rate at which packets are being removed from the audio/video buffer 220a-c, an associated write pointer 225a-c will continue to rise within the buffer until the buffer is eventually filled to a maximum capacity. While the audio/video buffer 220a-c is being filled with packets at a slower rate than the rate at which packets are being removed from the audio/video buffer 220a-c, an associated write pointer 225a-c will continue to drop within the buffer until the buffer is eventually emptied.

In embodiments, each audio/video buffer may include various regions indicating the rate at which packets are being received by the buffer with respect to the rate at which packets are being output from the buffer. For example, each audio/video buffer may have a maximum capacity, the maximum capacity being the maximum number of packets that may be retained by the buffer at any given time. Each buffer may have a normal operating region, the normal operating region being the portion of the buffer that is below the maximum capacity of the buffer and above a normal operating threshold (e.g., normal operating threshold 245a-c). Each buffer may have a stressed operating region, the stressed operating region being the portion of the buffer that is below the normal operating threshold and above an underflow threshold (e.g., underflow threshold 250a-c). Each buffer may have an underflow region, the underflow region being the portion of the buffer that is below the underflow threshold.

The central device 105 may make a determination as to the status of the audio/video buffers 220a-c based upon feedback received from the various client devices (e.g., clients 1-3) associated with the audio/video buffers. It should be understood that a client device 125 can provide feedback associated with the position of a write pointer to the central device 105 periodically or conditionally (e.g., when the write pointer crosses a threshold boundary, when the write pointer has been within a certain buffer region for a predetermined period of time, etc.).

When the write pointer 225a-c is positioned within the normal operating region of an audio/video buffer 220a-c (as is the case for the write pointers 225b-c shown in FIG. 2B), the packet prioritization module 210 can determine that the client device associated with the respective audio/video buffer 220 is receiving packets at a rate sufficient to keep up with the rate at which packets are being output by the respective audio/video buffer 220. When the write pointer 225a-c is positioned within the underflow region of an audio/video buffer 220a-c (as is the case for the write pointer 225a shown in FIG. 2C), the packet prioritization module 210 can determine that the client device associated with the respective audio/video buffer 220 is consuming packets from the buffer at faster rate than the rate at which packets are being written into the buffer, and that an underflow event at the buffer is imminent. Thus, the packet prioritization module 210 can determine that delivery of packets to the client device operating at the underflow condition (e.g., client 1) should be prioritized over client devices that are operating at a normal condition (e.g., clients 2 and 3) or stressed condition. Packet transmissions to each client device operating at a normal condition (e.g., clients 2 and 3) may be delayed to allow an increase in the rate at which packets are transmitted to the client device operating in an underflow condition (e.g., client 1) until the audio/video buffer associated with the underflow device is filled to a normal operation region.

Where the central device 105 and/or corresponding local network (e.g., local network 120 of FIG. 1) are operating at or near a predetermined maximum bandwidth, increasing the rate at which data is delivered to a client device 125 (e.g., client 1) may come at the expense of another client device 125 (e.g., clients 2 and/or 3). The packet prioritization module may compare the positions of write pointers 225a-c for each client device 125 to determine which if any of the client devices (e.g., clients 1-3) are in the best position to potentially handle a slowdown of data delivery. In FIG. 2C, the position of write pointers 225b-c indicates that the audio/video buffers 220b-c associated with clients 2 and 3 are nearly full, thus the packet prioritization module 210 may make the determination to briefly hold off sending a packet to clients 2 and 3, and use the additional air time or bandwidth to send additional packets to client 1.

In embodiments, the packet prioritization module 210 can prioritize packet transmissions by regulating the rate and/or order at which packets are transmitted to client devices. For example, when the packet prioritization module 210 determines that audio/video buffer 220a of client 1 is operating at an underflow condition and that each audio/video buffer 220b-c of clients 2 and 3 are operating at a normal operating condition (as is the case in FIG. 2C), the packet prioritization module 210 can schedule the output of packets such that client 1 is favored over clients 2 and/or 3. As an example, a transmission of packets to clients 2 and 3 can be skipped such that extra packet transmissions can be made to client 1. The output of packets to clients 1-3 may be scheduled at a 3:0:0 (client 1:client 2:client 3) ratio.

In embodiments, the packet prioritization module 210 can regulate the rate at which packets are transmitted to client devices by manipulating the order at which packets are placed into client transmitter buffers 215a-c. For example, when client 1 is operating at an underflow condition and each of clients 2 and 3 are operating at a normal operating condition, the packet prioritization module 210 may give greater priority to filling the client 1 transmitter buffer 215a over client transmitter buffers 215b-c (e.g., where bandwidth permits three packets to be output, three packets may be placed into client 1 transmitter buffer 215a and client transmitter buffers 215b-c can be left empty). Thus, during the current packet transmission instance shown in FIG. 2C, packets are withheld from clients 2 and 3 so that more packets may be delivered to client 1 to allow the audio/video buffer 220a to refill.

Packets may be output from the client transmitter buffers 215a-c to an associated client device through a local network interface 255 (e.g., Wi-Fi, Ethernet, MoCA, etc.). The output of packets from the client transmitter buffers 215a-c may be scheduled such that all packets within a first buffer (e.g., client 1 transmitter buffer 215a) are output, then all packets within a second buffer (e.g., client 2 transmitter buffer 215b) are output, then all packets within a next buffer (e.g., client 3 transmitter buffer 215c) are output, and after all packets are output from the last client transmitter buffer, the transmission algorithm may be repeated starting at the first buffer. As an example, where client 1 is operating at an underflow condition and each of clients 2 and 3 are operating at a normal operating condition, and the client transmitter buffers 215a-c are filled according to client 1 having a higher priority than clients 2 and 3, transmission of the packets from the client transmitter buffers 215a-c would result in the packet transmit order 270. In transmit time slot "N," client 1 is set to receive its respective packets (P1a-c). During transmit time slot "N," three packets (P1a-c) are delivered to client 1, whereas no packets are delivered to clients 2 or 3. Packets output from the central device 105 during transmit time slot "N" are placed into an associated client receiver buffer 235a, and added to an audio/video buffer 220a. Prioritization of transmissions to client 1 over transmissions to clients 2 and 3 may be continued (e.g., through transmit time slot N+1, transmit time slot N+2, and so on) until the write pointer 225a crosses the normal operating threshold 245a to enter a normal operating region.

Figure 3:
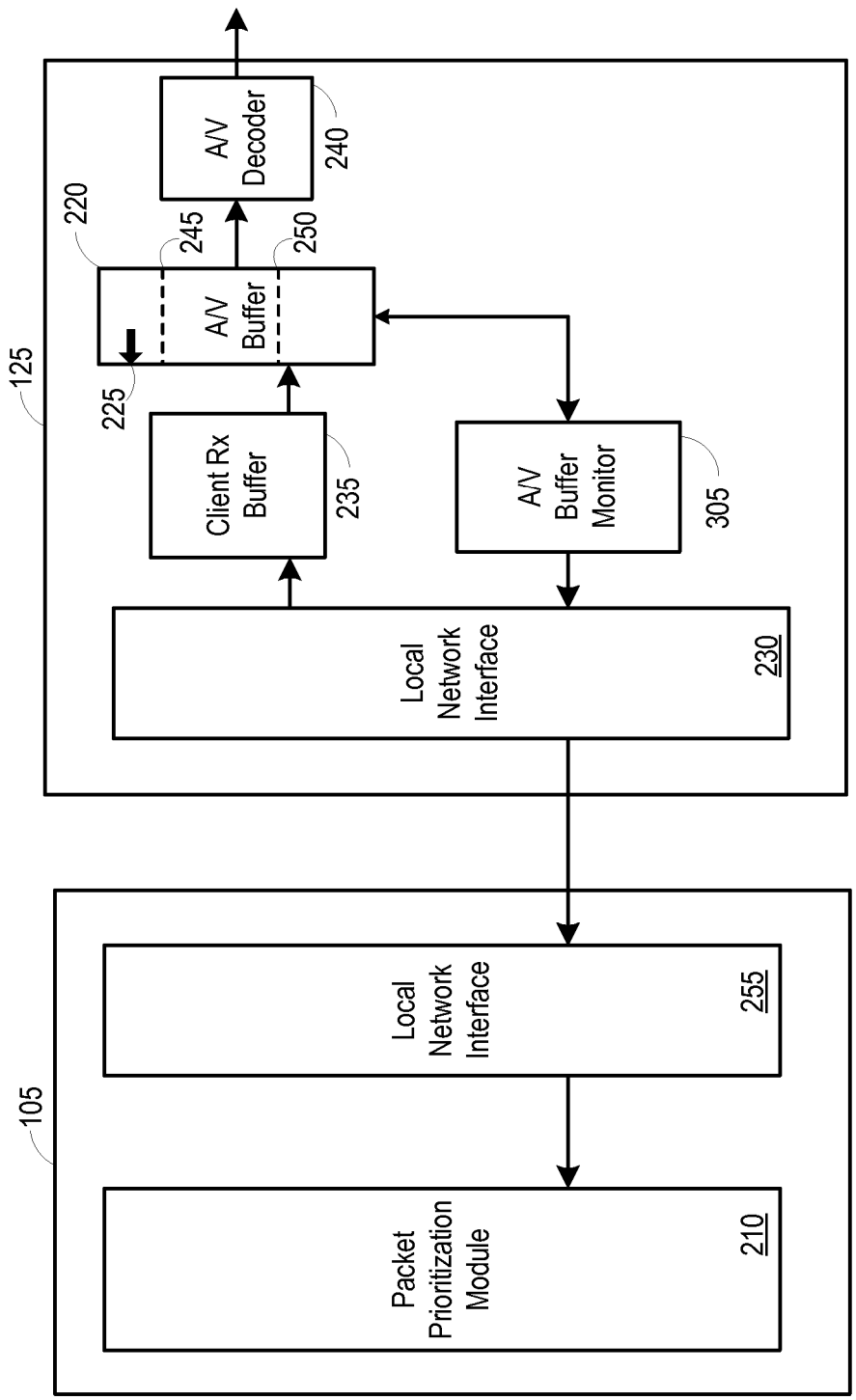
FIG. 3 is a block diagram illustrating an example client device operable to facilitate dynamic packet prioritization for delivery of content to multiple client devices.

FIG. 3 is a block diagram illustrating an example client device 125 operable to facilitate dynamic packet prioritization for delivery of content to multiple devices. The client device 125 may include an audio/video buffer monitor 305. The audio/video monitor 305 may monitor an audio/video buffer 220 and may generate and output a report including statistics or status reports associated with the audio/video buffer 220.

Packets may be received from a central device 105 at a client device 125 through a local network interface 230. As packets are received at a client device 125 the received packets may be placed into a receiver buffer (e.g., client receiver buffer 235). From the client receiver buffer 235, packets may be moved or written into an audio/video buffer 220. As an example, a buffer may be filled from the bottom to the top, wherein a packet is written into a buffer at the position of a write pointer 225, and the write pointer 225 may be positioned at the highest available slot in the buffer. Packets may be read or removed from the bottom of the audio/video buffer 220 by an audio/video decoder 240, and may be output from an audio/video decoder 240 to a display device associated with the respective client device 125. Those skilled in the relevant art will appreciate that this is only one example type of buffer, and that various types of buffers may be used as the audio/video buffer 220. While the audio/video buffer 220 is shown as being linear, it should be understood that the audio/video buffer 220 may be a circular buffer.

In embodiments, the status of an audio/video buffer 220 may be determined based upon the position of a write pointer 225 within the audio/video buffer 220. While an audio/video buffer 220 is being filled with packets at a faster rate than the rate at which packets are being removed from the audio/video buffer 220, an associated write pointer 225 will continue to rise within the buffer until the buffer is eventually filled to a maximum capacity. While the audio/video buffer 220 is being filled with packets at a slower rate than the rate at which packets are being removed from the audio/video buffer 220, an associated write pointer 225 will continue to drop within the buffer until the buffer is eventually emptied.

In embodiments, each audio/video buffer may include various regions indicating the rate at which packets are being received by the buffer with respect to the rate at which packets are being output from the buffer. For example, each audio/video buffer may have a maximum capacity, the maximum capacity being the maximum number of packets that may be retained by the buffer at any given time. Each buffer may have a normal operating region, the normal operating region being the portion of the buffer that is below the maximum capacity of the buffer and above a normal operating threshold (e.g., normal operating threshold 245). Each buffer may have a stressed operating region, the stressed operating region being the portion of the buffer that is below the normal operating threshold and above an underflow threshold (e.g., underflow threshold 250). Each buffer may have an underflow region, the underflow region being the portion of the buffer that is below the underflow threshold. It should be understood that the maximum capacity of a buffer may be upgraded or may be variable, and that the thresholds and regions may be altered accordingly.

In embodiments, the audio/video buffer monitor 305 may poll the audio/video buffer 220 to identify the current position of the write pointer 225 within the audio/video buffer 220. The audio/video buffer monitor 305 may identify a region the write pointer 225 is within based upon the position of the write pointer 225 relative to one or more thresholds or boundaries (e.g., normal operating threshold 245, underflow threshold 250, etc.). The audio/video buffer monitor 305 may generate a message identifying the position of the write pointer 225 within the audio/video buffer 220 and/or a corresponding region of the buffer (e.g., normal operating region, stressed operating region, underflow region, etc.). It should be understood that the position of the write pointer 225 may be described in various ways or formats (e.g., identification of a slot position within the buffer, distance between the write pointer and a corresponding read pointer, percentage of the buffer that is filled, etc.).

The audio/video buffer monitor 305 may poll the audio/video buffer 220 periodically. For example, the audio/video buffer 220 may generate a report identifying the position of a write pointer 225 within the audio/video buffer 220 once over a predetermined period (e.g., one (1) minute, two (2) minutes, etc.) when the audio/video buffer 220 is in a normal operating condition. The audio/video buffer 220 may generate a report identifying the position of a write pointer 225 at an increased frequency (e.g., once every thirty (30) seconds, fifteen (15) seconds, etc.) when the write pointer 225 enters a stressed operating region or underflow region of the audio/video buffer 220.

The audio/video buffer monitor 305 may poll the audio/video buffer 220 conditionally. For example, the audio/video buffer monitor 305 may receive a notification when the write pointer 225 crosses a threshold (e.g., normal operating threshold 245, underflow threshold 250, etc.) of the audio/video buffer 220, and the audio/video buffer monitor 305 can generate a message to notify a central device 105 of the transition. The audio/video buffer monitor 305 may poll the audio/video buffer 220 in response to a request received from a central device 105. The central device 105 may request an identification of the status of a write pointer 225 within an audio/video buffer 220 periodically, and the frequency at which the central device 105 requests a report from the client device 125 may be based upon the most recent status of the write pointer 225. For example, when the write pointer 225 is within a normal operating region of an audio/video buffer 220, the central device 105 may request a report at a first frequency (e.g., once every minute, two (2) minutes, etc.), but when the central device 105 determines that the write pointer 225 has entered into a stressed or underflow region of the audio/video buffer 220, the central device 105 may request a report at a second frequency (e.g., once every thirty (30) seconds, fifteen (15) seconds, etc.).

In embodiments, the message generated by the audio/video buffer monitor 305 may be output to a central device 105 through the local network interface 230, and may be received by a packet prioritization module 210 through a local network interface 255 at the central device 105. The packet prioritization module 210 may make a determination as to the status of the audio/video buffer 220 based upon feedback received from the client device 125. For example, when the write pointer 225 is positioned within the normal operating region of an audio/video buffer 220, the packet prioritization module 210 can determine that the client device 125 associated with the audio/video buffer 220 is receiving packets at a rate sufficient to keep up with the rate at which packets are being output by the audio/video buffer 220. When the write pointer 225 is positioned within a stressed operating region or underflow region of an audio/video buffer 220, the packet prioritization module 210 may determine that the client device 125 associated with the audio/video buffer 220 is consuming packets at a faster rate than the rate at which the audio/video buffer 220 is receiving packets, and the packet prioritization module 210 may prioritize packet transmissions to the client device 125 at the expense of one or more other client devices 125.

Figure 4:
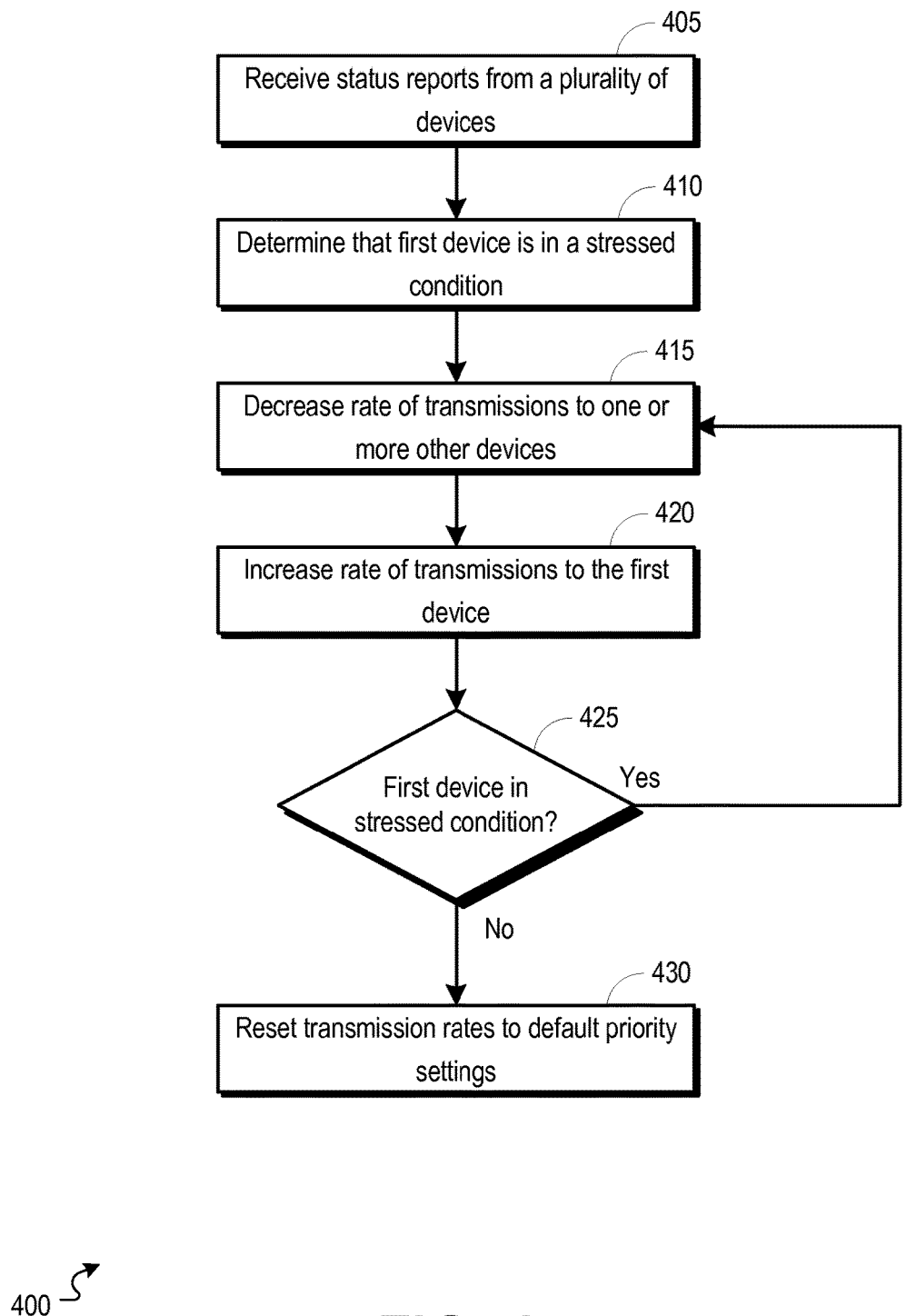
FIG. 4 is a flowchart illustrating an example process operable to facilitate dynamic packet prioritization for delivery of content to multiple devices.

FIG. 4 is a flowchart illustrating an example process 400 operable to facilitate dynamic packet prioritization for delivery of content to multiple devices. The process 400 may be carried out by a central device 105 of FIG. 1 while outputting communications to a plurality of client devices (e.g., client devices 125 of FIG. 1). It should be understood that the process 400 may be carried out continuously, periodically, or conditionally. For example, transmissions of communications to one or more of a plurality of client devices may be prioritized when resources of the central device 105 and/or corresponding local network (e.g., local network 120 of FIG. 1) become congested.

At 405, status reports may be received from a plurality of devices. A central device 105 of FIG. 1 may receive a status report from each of a plurality of client devices 125 of FIG. 1, wherein the status report provides information associated with the status of a buffer at each respective client device 125. For example, each status report may provide an indication of the number of packets relative to a threshold level associated with a buffer. In embodiments, each status report may identify a position of a write pointer 225 of FIG. 2A within an audio/video buffer 220 of FIG. 2A. Each status report may identify a region of the audio/video buffer 220 (e.g., normal operating region, stressed operating region, underflow region, etc.) that the write pointer 225 is within. It should be understood that the position of the write pointer 225 may be described in various ways or formats (e.g., identification of a slot position within the buffer, distance between the write pointer and a corresponding read pointer, percentage of the buffer that is filled, etc.). It should be further understood that a client device 125 can provide feedback associated with the position of a write pointer to the central device 105 periodically or conditionally (e.g., when the write pointer crosses a threshold boundary, when the write pointer has been within a certain buffer region for a predetermined period of time, etc.).

In embodiments, each audio/video buffer may include various regions indicating the rate at which packets are being received by the buffer with respect to the rate at which packets are being output from the buffer. For example, each audio/video buffer may have a maximum capacity, the maximum capacity being the maximum number of packets that may be retained by the buffer at any given time. Each buffer may have a normal operating region, the normal operating region being the portion of the buffer that is below the maximum capacity of the buffer and above a normal operating threshold (e.g., normal operating threshold 245 of FIG. 2A). Each buffer may have a stressed operating region, the stressed operating region being the portion of the buffer that is below the normal operating threshold and above an underflow threshold (e.g., underflow threshold 250 of FIG. 2A). Each buffer may have an underflow region, the underflow region being the portion of the buffer that is below the underflow threshold.

At 410, a determination may be made that a first device is in a stressed condition. The determination that a first device is in a stressed condition may be made, for example, by a central device 105 of FIG. 1 (e.g., packet prioritization module 210 of FIG. 2A). The determination that a first device is in a stressed condition may be based upon the position of a write pointer 225 within a buffer (e.g., audio/video buffer 220 of FIG. 2A) associated with the first device. For example, the packet prioritization module 210 may determine that a device is in a stressed condition when a write pointer 225 is within a stressed operating region or underflow region of an audio/video buffer 220 associated with the device.

When the write pointer 225 is positioned within the normal operating region of an audio/video buffer 220, the packet prioritization module 210 can determine that the client device associated with the respective audio/video buffer 220 is receiving packets at a rate sufficient to keep up with the rate at which packets are being output by the respective audio/video buffer 220. When the write pointer 225 is positioned within the stressed operating region of an audio/video buffer 220, the packet prioritization module 220 can determine that the client device associated with the respective audio/video buffer 220 is consuming packets from the buffer at a faster rate than the rate at which packets are being written into the buffer. When the write pointer 225 is positioned within the underflow region of an audio/video buffer 220a-c, the packet prioritization module 210 can determine that the client device associated with the respective audio/video buffer 220 is consuming packets from the buffer at a faster rate than the rate at which packets are being written into the buffer, and that an underflow event at the buffer is imminent.

At 415, the rate at which communications are transmitted to one or more devices other than the first device may be decreased. In embodiments, the packet prioritization module 210 may determine that delivery of packets to the first device is to be prioritized over the delivery of packets to one or more other devices, wherein the other devices are operating at a normal operating condition. Packet transmissions to each of the one or more other client devices operating at a normal condition may be delayed to allow an increase in the rate at which packets are transmitted to the first client device that is operating in a stressed condition.

Where the central device 105 and/or corresponding local network (e.g., local network 120 of FIG. 1) are operating at or near a predetermined maximum bandwidth, increasing the rate at which data is delivered to a client device 125 may come at the expense of one or more other client devices 125. The packet prioritization module 210 may compare the positions of write pointers 225 for each client device 125 to determine which if any of the client devices are in the best position to potentially handle a slowdown of data delivery. The one or more other devices selected for a decreased rate of packet transmissions may include one or more client devices having audio/video buffers 220 that are operating within a normal operating region (i.e., a write pointer 225 is within the normal operating region of the buffer 220). The packet prioritization module 210 may make the determination to briefly hold off sending a packet to the one or more other devices, and use the additional air time or bandwidth to send additional packets to the first device.

At 420, the rate at which communications are transmitted to the first device may be increased. In embodiments, the packet prioritization module 210 may prioritize the delivery of packets to the first device over the delivery of packets to the one or more other devices. Using the bandwidth available as a result of decreasing the rate of transmissions to the one or more other devices, the packet prioritization module 210 can increase the rate of transmissions to the first device.

In embodiments, the packet prioritization module 210 can prioritize packet transmissions by regulating the rate and/or order at which packets are transmitted to client devices. For example, when the packet prioritization module 210 determines that the first device is to be prioritized over the one or more other devices, the packet prioritization module 210 can schedule the output of packets such that the first device is favored over the one or more other devices. As an example, a transmission of packets to one or more of the other devices can be skipped or delayed such that extra packet transmissions can be made to the first device.

In embodiments, the packet prioritization module 210 can regulate the rate at which packets are transmitted to client devices by manipulating the order at which packets are placed into client transmitter buffers 215 of FIG. 2A-C. For example, when the first device is prioritized over the one or more other devices, the packet prioritization module 210 may give greater priority to filling a transmitter buffer 215 associated with the first device over client transmitter buffers 215 associated with the one or more other devices.

At 425, a determination can be made whether the first device is still in a stressed condition. The determination whether the first device is still in a stressed condition may be made, for example, by the central device 105 (e.g., at the packet prioritization module 210). In embodiments, the packet prioritization module 210 may make the determination whether the first device is still in a stressed condition based upon the most recent report received by the central device 105 from the first device, wherein the report indicates the most recently monitored position of a write pointer 225 within an audio/video buffer 220.

If, at 425, the determination is made that the first device is still in a stressed condition, the process 400 can return to 415. For example, if the packet prioritization module 210 determines that a write pointer 225 is within a stressed operating region or underflow region of an audio/video buffer 220 associated with the first device, the rate of transmitting communications to the one or more other devices may be maintained or may be further decreased and the rate of transmitting communications to the first device may be maintained or may be further increased at 415 and 420 respectively. In embodiments, the packet prioritization module 210 may make the determination that the position of the write pointer 225 within the audio/video buffer 220 has improved as a result of the most recent rate decrease of transmissions to the one or more other devices and rate increase of transmissions to the first device, and the packet prioritization module 210 can maintain the current rates of transmissions to the one or more other devices and first device.

If, at 430, the determination is made that the first device is no longer in a stressed condition, the process 400 can proceed to 430. For example, if the packet prioritization module 210 determines that a write pointer 225 is within a normal operating region of an audio/video buffer 220 associated with the first device, prioritization of communication transmissions to each of the plurality of devices may be reset to a previous or default priority setting. Delivery of packets to each of the plurality of devices may be scheduled according to a previous or default delivery schedule or prioritization of devices or flows.

Figure 5:
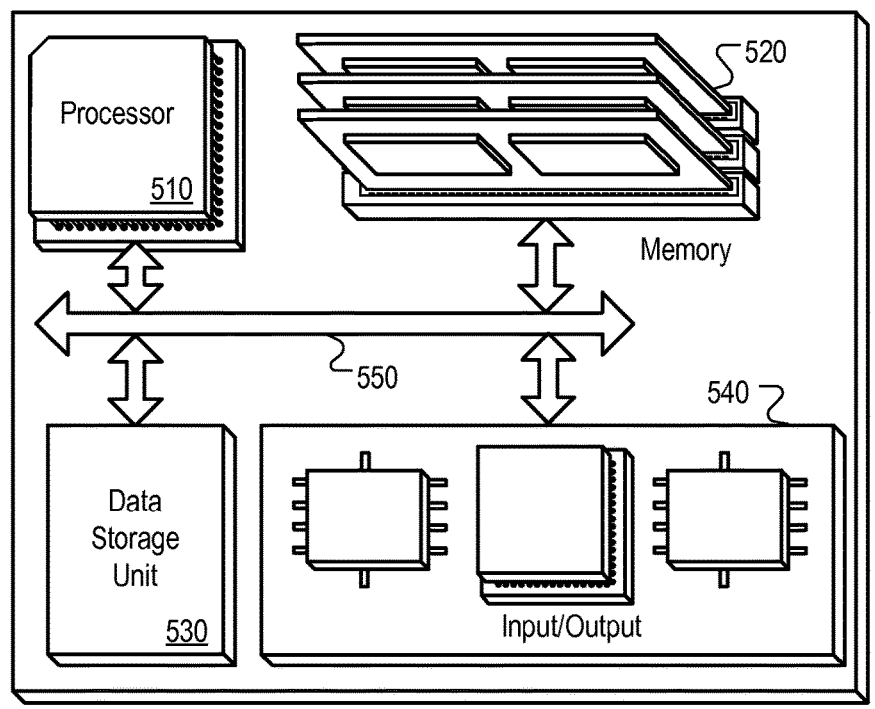
FIG. 5 is a block diagram of a hardware configuration operable to facilitate dynamic packet prioritization for delivery of content to multiple devices.

FIG. 5 is a block diagram of a hardware configuration 500 operable to facilitate dynamic packet prioritization for delivery of content to multiple devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 125 of FIG. 1 (e.g., STB, television, computer, tablet, mobile device, etc.). In embodiments, the input/output device can include driver devices configured to send communications to, and receive communications from one or more networks (e.g., local network 120 of FIG. 1, subscriber network 115 of FIG. 1, WAN 110 of FIG. 1, etc.).

Those skilled in the art will appreciate that the invention improves upon methods and systems for prioritizing packet delivery. Methods, systems, and computer readable media described herein are operable to prioritize packet delivery to a plurality of client devices based upon feedback received from the client devices, wherein the feedback includes buffer status information associated with the client devices. The rate of transmitting packets to a client device having a stressed buffer may be increased, while the rate of transmitting packets to one or more other client devices may be decreased. Buffer status information may be received periodically or conditionally at a central device in the form of feedback messages output from one or more client devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   outputting one or more packet streams from a central device to each of a plurality of client devices;
   receiving a message from one or more respective client devices of the plurality of client devices, wherein the message indicates the status of a buffer associated with each respective client device;
   determining that at least one of the respective client devices is in a stressed condition based upon the buffer status indicated in the message received from the at least one respective client device, wherein the message indicates that the number of packets within the buffer associated with the at least one respective client device in a stressed condition is less than a threshold level; and
   prioritizing the delivery of packets to the at least one respective client device that is determined to be in a stressed condition over the delivery of packets to the one or more other client devices within the plurality of client devices, wherein prioritizing the delivery of packets to the at least one respective client device that is determined to be in a stressed condition over the delivery of packets to the one or more other client devices within the plurality of client devices comprises:
   placing a greater number of packets into a transmitter buffer associated with the at least one respective client device than a number of packets placed into each transmitter buffer associated with the one or more other client devices within the plurality of client devices, wherein the transmitter buffers are located at the central device; and
   for each respective transmitter buffer, outputting packets from the respective transmitter buffer during a certain time slot, wherein the packets are output to a target client device.

2. The method of claim 1, wherein prioritizing the delivery of packets to the at least one respective client device that is determined to be in a stressed condition over the delivery of packets to the one or more other client devices within the plurality of client devices comprises:
   decreasing the rate at which packets are delivered to the one or more other client devices within the plurality of client devices; and
   increasing the rate at which packets are delivered to the at least one respective client device that is determined to be in a stressed condition.

3. The method of claim 2, wherein the message received from at least one of the other client devices indicates that packets are being received by the buffer associated with the at least one of the other client devices at a rate greater than or equivalent to the rate at which packets are being output from the buffer, such that delivery of packets to the buffer may be delayed without causing the buffer to empty.

4. The method of claim 1, wherein the message indicates the status of a buffer associated with a client device by identifying the position of a write pointer within the buffer.

5. The method of claim 4, wherein the position of the write pointer within the buffer is identified with respect to one or more boundaries associated with the buffer.

6. The method of claim 1, further comprising:
periodically outputting requests to one or more of the plurality of client devices for information associated with the status of a buffer, wherein the message from one or more respective client devices of the plurality of client devices is received in response to the requests.

7. The method of claim 6 wherein:
requests are periodically output at a first frequency to devices that are not in a stressed condition; and
requests are periodically output at a second frequency to devices that are in a stressed condition, the second frequency being higher than the first frequency.

8. The method of claim 1, further comprising:
when the at least one respective client device is no longer operating at a stressed condition, re-establishing a default prioritization of packet delivery for the plurality of client devices.

9. An apparatus comprising:
one or more interfaces that:
output one or more packet streams to each of a plurality of client devices; and
receive a message from one or more respective client devices of the plurality of client devices, wherein the message indicates the status of a buffer associated with each respective client device;
a module that:
determines that at least one of the respective client devices is in a stressed condition based upon the buffer status indicated in the message received from the at least one respective client device; and
prioritizes the delivery of packets to the at least one respective client device that is determined to be in a stressed condition over the delivery of packets to the one or more other client devices within the plurality of client devices, wherein prioritizing the delivery of packets to the at least one respective client device that is determined to be in a stressed condition over the delivery of packets to the one or more other client devices within the plurality of client devices comprises:
placing a greater number of packets into a transmitter buffer associated with the at least one respective client device than a number of packets placed into each transmitter buffer associated with the one or more other client devices within the plurality of client devices; and
for each respective transmitter buffer, outputting packets from the respective transmitter buffer during a certain time slot, wherein the packets are output to a target client device.

10. The apparatus of claim 9, wherein prioritizing the delivery of packets to the at least one respective client device that is determined to be in a stressed condition over the delivery of packets to the one or more other client devices within the plurality of client devices comprises:
decreasing the rate at which packets are delivered to the one or more other client devices within the plurality of client devices; and
increasing the rate at which packets are delivered to the at least one respective client device that is determined to be in a stressed condition.

11. The apparatus of claim 10, wherein the message received from at least one of the other client devices indicates that packets are being received by the buffer associated with the at least one of the other client devices at a rate greater than or equivalent to the rate at which packets are being output from the buffer, such that delivery of packets to the buffer may be delayed without causing the buffer to empty.

12. The apparatus of claim 9, wherein the message indicates the status of a buffer associated with a client device by identifying the position of a write pointer within the buffer.

13. The apparatus of claim 12, wherein the position of the write pointer within the buffer is identified with respect to one or more boundaries associated with the buffer.

14. One or more non-transitory computer readable media having instructions operable to cause one or more processors to perform the operations comprising:
outputting one or more packet streams from a central device to each of a plurality of client devices;
receiving a message from one or more respective client devices of the plurality of client devices, wherein the message indicates the status of a buffer associated with each respective client device;
determining that at least one of the respective client devices is in a stressed condition based upon the buffer status indicated in the message received from the at least one respective client device; and
prioritizing the delivery of packets to the at least one respective client device that is determined to be in a stressed condition over the delivery of packets to the one or more other client devices within the plurality of client devices, wherein prioritizing the delivery of packets to the at least one respective client device that is determined to be in a stressed condition over the delivery of packets to the one or more other client devices within the plurality of client devices comprises:
placing a greater number of packets into a transmitter buffer associated with the at least one respective client device than a number of packets placed into each transmitter buffer associated with the one or more other client devices within the plurality of client devices, wherein the transmitter buffers are located at the central device; and
for each respective transmitter buffer, outputting packets from the respective transmitter buffer during a certain time slot, wherein the packets are output to a target client device.

15. The one or more non-transitory computer-readable media of claim 14, wherein prioritizing the delivery of packets to the at least one respective client device that is determined to be in a stressed condition over the delivery of packets to the one or more other client devices within the plurality of client devices comprises:
decreasing the rate at which packets are delivered to the one or more other client devices within the plurality of client devices; and
increasing the rate at which packets are delivered to the at least one respective client device that is determined to be in a stressed condition.

16. The one or more non-transitory computer-readable media of claim 15, wherein the message received from at least one of the other client devices indicates that packets are being received by the buffer associated with the at least one of the other client devices at a rate greater than or equivalent to the rate at which packets are being output from the buffer, such that delivery of packets to the buffer may be delayed without causing the buffer to empty.

17. The one or more non-transitory computer-readable media of claim 14, wherein the message indicates the status of a buffer associated with a client device by identifying the position of a write pointer within the buffer.

18. The one or more non-transitory computer-readable media of claim 17, wherein the position of the write pointer within the buffer is identified with respect to one or more boundaries associated with the buffer.

19. The one or more non-transitory computer-readable media of claim 14, wherein the instructions are further operable to cause one or more processors to perform the operations comprising:
   periodically outputting requests to one or more of the plurality of client devices for information associated with the status of a buffer, wherein the message from one or more respective client devices of the plurality of client devices is received in response to the requests.

20. The one or more non-transitory computer-readable media of claim 19, wherein:
   requests are periodically output at a first frequency to devices that are not in a stressed condition; and
   requests are periodically output at a second frequency to devices that are in a stressed condition, the second frequency being higher than the first frequency.

* * * * *